(12) United States Patent
Yi

(10) Patent No.: US 12,411,045 B1
(45) Date of Patent: Sep. 9, 2025

(54) INFRARED THERMAL IMAGING NIGHT VISION MONOCULAR

(71) Applicant: Zhibing Yi, Guangdong (CN)

(72) Inventor: Zhibing Yi, Guangdong (CN)

( * ) Notice: Subject to any disclaimer, the term of this patent is extended or adjusted under 35 U.S.C. 154(b) by 0 days.

(21) Appl. No.: 19/020,561

(22) Filed: Jan. 14, 2025

(30) Foreign Application Priority Data

Mar. 5, 2024 (CN) .......................... 202420421723.8

(51) Int. Cl.
| | | |
|---|---|---|
| G01J 5/04 | (2006.01) | |
| G01J 5/00 | (2022.01) | |
| G01J 5/02 | (2022.01) | |
| G01J 5/03 | (2022.01) | |
| G02B 23/12 | (2006.01) | |
| G02B 23/16 | (2006.01) | |
| H04N 23/23 | (2023.01) | |
| H04N 23/51 | (2023.01) | |

(52) U.S. Cl.
CPC ............. *G01J 5/048* (2013.01); *G01J 5/0265* (2013.01); *G01J 5/03* (2022.01); *G02B 23/12* (2013.01); *G02B 23/16* (2013.01); *H04N 23/23* (2023.01); *H04N 23/51* (2023.01); *G01J 5/0025* (2013.01); *G01J 2005/0077* (2013.01)

(58) Field of Classification Search
None
See application file for complete search history.

(56) References Cited

U.S. PATENT DOCUMENTS

| | | | | |
|---|---|---|---|---|
| 2005/0128584 A1* | 6/2005 | Shulman | .............. | H04N 13/341 |
| | | | | 359/462 |
| 2008/0302966 A1* | 12/2008 | Reed | ...................... | G02B 23/12 |
| | | | | 250/330 |
| 2010/0001927 A1* | 1/2010 | Hough | ................... | G02B 7/002 |
| | | | | 345/8 |

FOREIGN PATENT DOCUMENTS

CN 220122967 U * 12/2023

* cited by examiner

*Primary Examiner* — Edwin C Gunberg
(74) *Attorney, Agent, or Firm* — HOWARD M COHN and Associates, LLC

(57) ABSTRACT

An infrared thermal imaging night vision monocular includes a housing, an infrared lens module, a thermal imaging lens module, a main board, and a display screen. The infrared lens module is disposed on a front end of the housing. The thermal imaging lens module is disposed on a first side wall of the housing. The display screen is disposed on a rear end of the housing. The main board is disposed in the housing. The main board is electrically connected to the infrared lens module, the thermal imaging lens module, and the display screen. The display screen is configured to sequentially display image information collected by the infrared lens module and image information collected by the thermal imaging lens module, so target images are quickly captured and displayed in high definition without a need of observing the target images through different display screens back and forth.

10 Claims, 3 Drawing Sheets and the second display screen are disposed at a rear end of the housing. The infrared lens module, the thermal imaging lens module, the first display screen, and the second display screen are electrically connected to the main board. The first display screen is configured to display image information collected by the infrared lens module, and the second display screen is configured to display image information collected by the thermal imaging lens module.

INFRARED THERMAL IMAGING NIGHT VISION MONOCULAR

TECHNICAL FIELD

The present disclosure relates to a field of night vision telescopes, and in particular to an infrared thermal imaging night vision monocular.

BACKGROUND

Infrared night vision devices are night vision devices that apply photoelectric conversion technology. The infrared night vision devices are divided into active infrared night vision devices and passive infrared night vision devices. The active infrared night vision devices use infrared searchlights to illuminate a target and receive reflected infrared radiation to form an image. The passive infrared night vision devices do not emit infrared rays, but rely on infrared radiation of the target itself to form a thermal image, so the massive infrared night vision devices are also known as thermal imaging devices.

In the prior art, the Chinese patent with a publication number CN220122967U discloses a night vision thermal imager that includes a housing, an infrared lens module, a thermal imaging lens module, a main board, a first display screen, a second display screen, and a battery. The infrared lens module and the thermal imaging lens module are disposed at a front end of the housing, the main board and the battery are disposed inside the housing, and the first display screen and the second display screen are disposed at a rear end of the housing. The infrared lens module, the thermal imaging lens module, the first display screen, and the second display screen are electrically connected to the main board. The first display screen is configured to display image information collected by the infrared lens module, and the second display screen is configured to display image information collected by the thermal imaging lens module.

The night vision thermal imager is able to quickly capture and clearly display target images at night by configuring the infrared lens module and the thermal imaging lens module. However, a user needs to observe the first and second display screens back and forth when using the night vision thermal imager, which makes it inconvenient to observe the target images. Further, a structural configuration thereof is not reasonable, which is not conducive to miniaturization of the night vision thermal imager.

SUMMARY

In view of this, the present disclosure provides an infrared thermal imaging night vision monocular to solve problems that a night vision thermal imager in the prior art is not convenient enough when observing images and the structural configuration of night vision thermal imager is not reasonable enough.

To achieve the above object, the present disclosure provides the infrared thermal imaging night vision monocular. The infrared thermal imaging night vision monocular comprises a housing, an infrared lens module, a thermal imaging lens module, a main board, and a display screen.

The infrared lens module is disposed on a front end of the housing. The thermal imaging lens module is disposed on a first side wall of the housing. The display screen is disposed on a rear end of the housing. The main board is disposed in the housing. The main board is electrically connected to the infrared lens module, the thermal imaging lens module, and the display screen.

The display screen is configured to sequentially display image information collected by the infrared lens module and image information collected by the thermal imaging lens module.

Optionally, a protective shell is disposed on the first side wall of the housing. The thermal imaging lens module is mounted in the protective shell. A lens of the thermal imaging lens module extends out of a front end of the protective shell.

Optionally, a first opening is defined in an inner side wall of the protective shell, a second opening is defined in the first side wall of the housing, and the first opening is corresponding to and communicated with the second opening.

Optionally, a lens carrier is disposed on the front end of the housing, and the infrared lens module is disposed in the lens carrier.

Optionally, an infrared transceiver is disposed on one side of the lens carrier, and the infrared transceiver is electrically connected to the main board.

Optionally, first connecting plates are respectively disposed on two opposite sides of a rear end of the lens carrier, first connecting grooves are respectively defined in front ends of two opposite inner walls of the housing, and the first connecting plates are respectively clamped in the first connecting grooves, so that the rear end of the lens carrier is inserted into and fixed to the front end of the housing.

Optionally, an observation cylinder is disposed on the rear end of the housing, and the display screen is disposed on a front end of the observation cylinder.

Optionally, an eyepiece is disposed at a rear end of the observation cylinder.

Optionally, second connecting plates are respectively disposed on two opposite sides of the front end of the observation cylinder, second connecting grooves are respectively defined in rear ends of two opposite inner walls of the housing, and the second connecting plates are respectively clamped in the second connecting grooves, so that the front end of the observation cylinder is inserted into and fixed to the rear end of the housing.

Optionally, the main board is electrically connected to a key board, and control keys are disposed on the key board. The control keys pass through a second side wall of the housing, and the second side wall of the housing is opposite to the first side wall of the housing.

In the infrared thermal imaging night vision monocular of the present disclosure, the image information collected by the thermal imaging lens module and the image information collected by the infrared lens module are displayed in sequence on the display screen, so target images are quickly captured and then displayed in high definition without a need of observing the target images through different display screens back and forth. Namely, the number of display screens in the prior art is optimized and a volume of the infrared thermal imaging night vision monocular is reduced.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled

Figure 1:
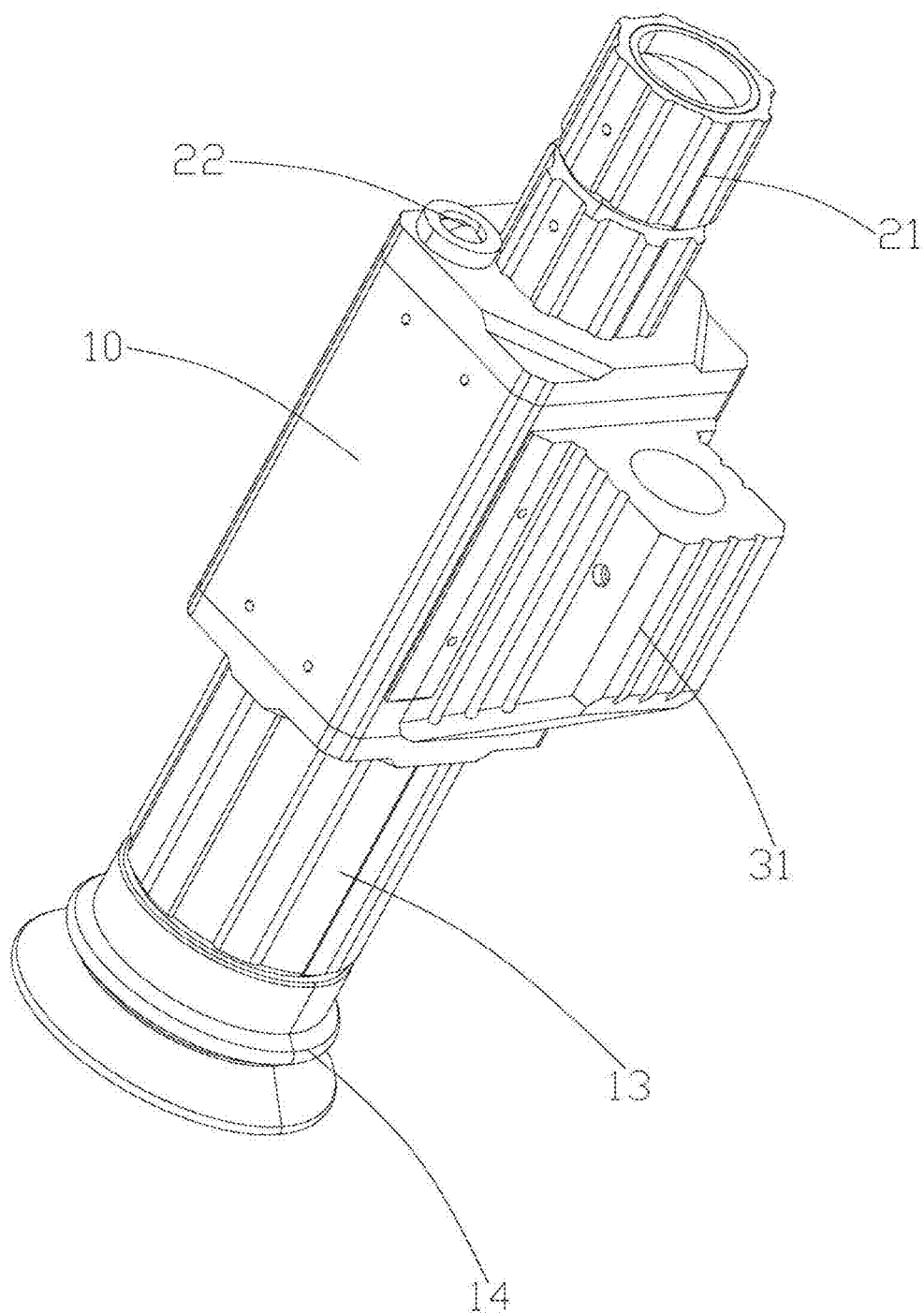
FIG. 1 is a schematic diagram of an infrared thermal imaging night vision monocular according to one embodiment of the present disclosure.

Reference numerals: 10—housing; 11—second opening; 12—first connecting groove; 13—observation cylinder; 131—second connecting plate; 14—eyepiece; 15—second connecting groove; 20—infrared lens module; 21—lens carrier; 211—first connecting plate; 22—infrared transceiver; 30—thermal imaging lens module; 31—protective shell; 311—first opening; 40—main board; 41—key board; 42—control key; 50—display screen.

DETAILED DESCRIPTION

Unless otherwise defined, all technical and scientific terms used herein have the same meaning as commonly understood by those skilled in the art of the present disclosure. The terminology used in the specification is for the purpose of describing specific embodiments only and is not intended to limit the present disclosure. The terms "comprise", "have", and any variations thereof in the specification and claims of the present disclosure and the above-mentioned drawings are intended to cover non-exclusive inclusions. The terms "first", "second", etc. in the specification and claims of the present disclosure or the above-mentioned drawings are used to distinguish different objects rather than to describe a specific order.

Reference herein to "embodiment" means that a particular feature, structure, or characteristic described in connection with one embodiment may be included in at least one embodiment of the present disclosure. The appearances of the "embodiment" in various positions in the specification are not necessarily referring to the same embodiment, and are not independent or alternative embodiments mutually exclusive of other embodiments. Those skilled in the art explicitly and implicitly understand that the embodiments described herein may be combined with other embodiments.

In order to enable those skilled in the art to better understand the solution of the present disclosure, the technical solutions in the embodiments of the present disclosure are clearly and completely described below in conjunction with the accompanying drawings.

Figure 2:
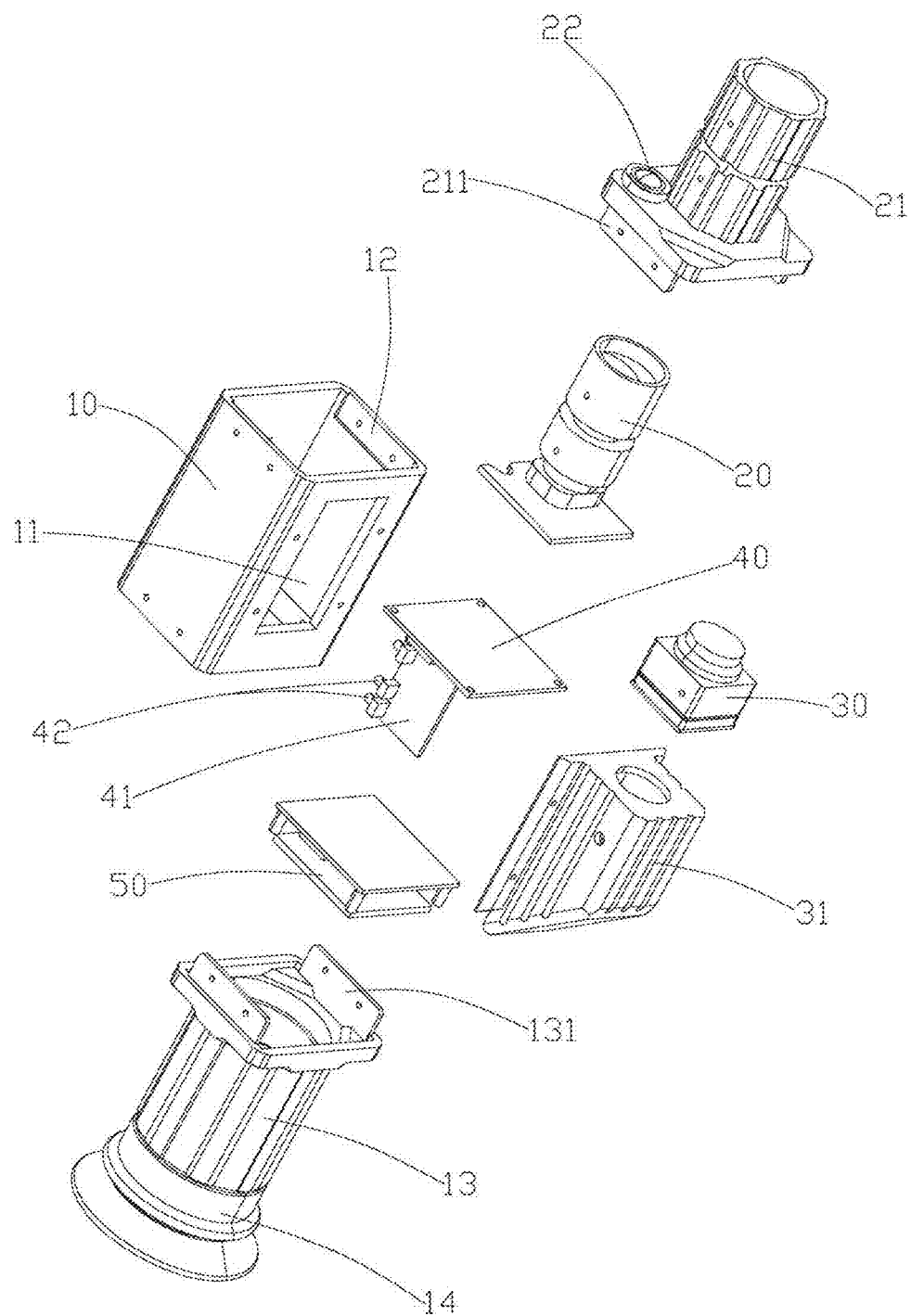
FIG. 2 is an exploded schematic diagram of the infrared thermal imaging night vision monocular according to one embodiment of the present disclosure.
Figure 3:
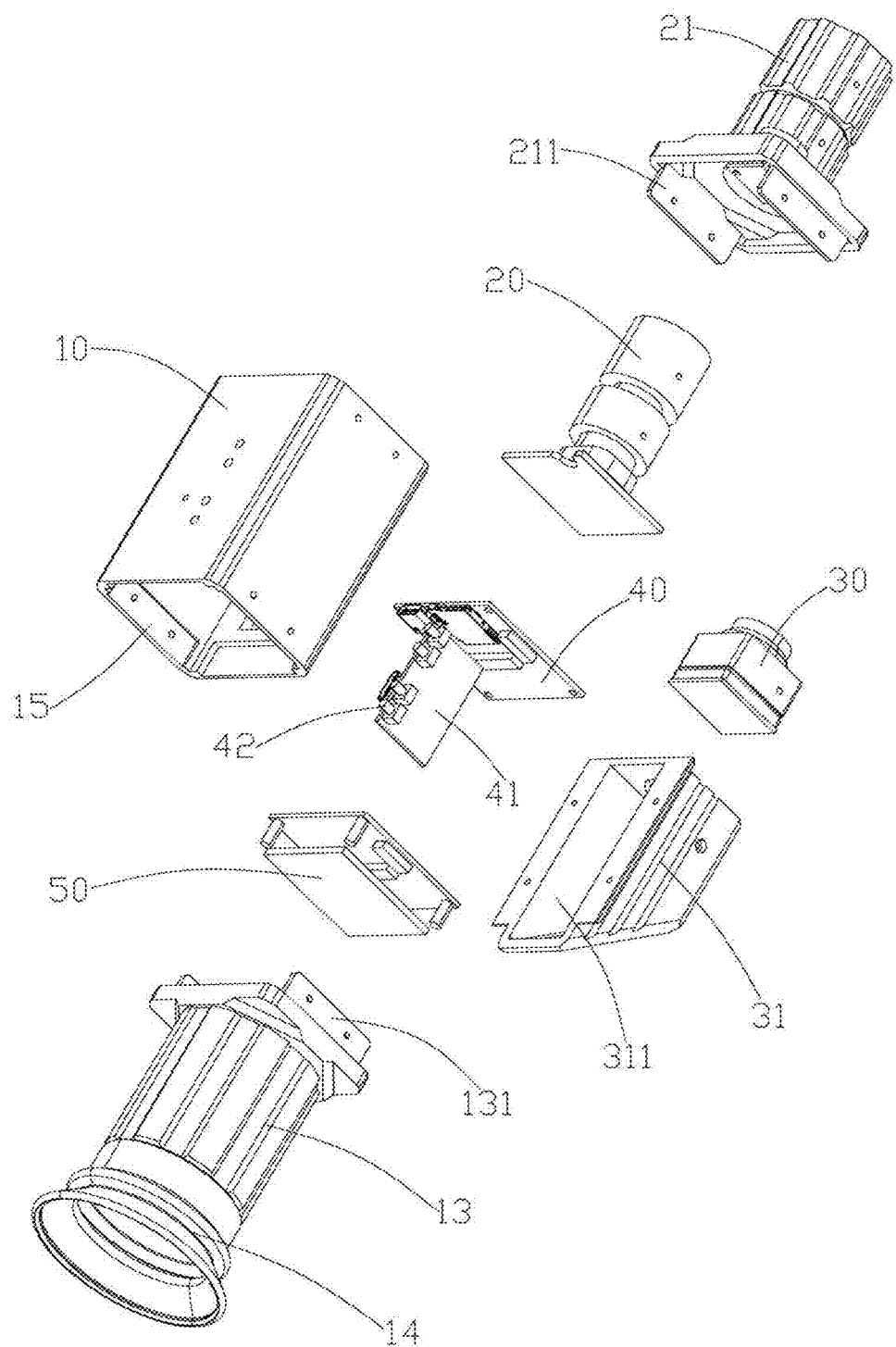
FIG. 3 is another exploded schematic diagram of the infrared thermal imaging night vision monocular according to one embodiment of the present disclosure.

One embodiment of the present disclosure is shown in FIGS. 1-3.

The present disclosure provides an infrared thermal imaging night vision monocular. The infrared thermal imaging night vision monocular comprises a housing 10, an infrared lens module 20, a thermal imaging lens module 30, a main board 40, and a display screen 50.

The infrared lens module 20 is disposed on a front end of the housing 10. The thermal imaging lens module 30 is disposed on a first side wall of the housing 10. The display screen 50 is disposed on a rear end of the housing 10. The main board 40 is disposed in the housing 10. The main board 40 is electrically connected to the infrared lens module 20, the thermal imaging lens module 30, and the display screen 50. A central processor is mounted on the main board 40 and the central processor is configured to encode and decode images and video signals captured by the infrared lens module 20 and the thermal imaging lens module 30. The display screen 50 is configured to sequentially display image information collected by the infrared lens module 20 and image information collected by the thermal imaging lens module 30.

For example, when observing a bird in a tree at night, the thermal imaging lens module 30 is configured to quickly find a position of the bird, and then the infrared lens module 20 is configured to capture a specific high-definition image of the bird. Then the display screen 50 sequentially displays an infrared radiation of the bird as a thermal image and a high-definition image, so a user is able to quickly find the position of the bird and then observe a clear image of the bird, which is convenient to use. In addition, the display screen 50 occupies a small volume and a small mounting space, which makes the infrared thermal imaging night vision monocular compact and easy to carry and use.

Furthermore, a protective shell 31 is disposed on the first side wall of the housing 10. The thermal imaging lens module 30 is mounted in the protective shell 31. A lens of the thermal imaging lens module 30 extends out of a front end of the protective shell 31. The thermal imaging lens module 30 is a vanadium oxide infrared lens. The protective shell 31 is configured to protect the thermal imaging lens module 30, so that only the lens of the thermal imaging lens module 30 is extended for shooting. Specifically, a first opening 311 is defined in an inner side wall of the protective shell 31, a second opening 11 is defined in the first side wall of the housing 10, and the first opening 311 is corresponding to and communicated with the second opening 11. Therefore, the thermal imaging lens module 30 is conveniently connected to the main board 40 disposed inside the housing 10 and a power supply disposed inside the housing 10.

Furthermore, a lens carrier 21 is disposed on the front end of the housing 10, and the infrared lens module 20 is disposed in the lens carrier 21. The lens carrier 21 is configured to protect the infrared lens module 20. First connecting plates 211 are respectively disposed on two opposite sides of a rear end of the lens carrier 21. First connecting grooves 12 are respectively defined in front ends of two opposite inner walls of the housing 10. The first connecting plates 211 are respectively clamped in the first connecting grooves 12, so that the rear end of the lens carrier 21 is inserted into and fixed to the front end of the housing 10. Moreover, the first connecting plates 211 and the first connecting grooves 12 are further connected by bolts, so the lens carrier 21 is stably fixed.

Furthermore, an infrared transceiver 22 is disposed on one side of the lens carrier 21. The infrared transceiver 22 is a part of the infrared lens module 20. The infrared transceiver 22 is electrically connected to the main board 40. The infrared transceiver 22 is configured to transmit and receive infrared signals. An infrared wavelength emitted by the infrared transceiver 22 is 850 nm.

Furthermore, an observation cylinder 13 is disposed on the rear end of the housing 10, and the display screen 50 is disposed on a front end of the observation cylinder 13. The observation cylinder 13 is configured to block external light and reduce backlight of the display screen 50. In addition, an eyepiece 14 is disposed at a rear end of the observation cylinder 13. The eyepiece 14 is configured to adjust a diopter to adapt to a vision strength of different users, so that the user is able to observe the display screen 50 more clearly.

Second connecting plates 131 are respectively disposed on two opposite sides of the front end of the observation cylinder 13. Second connecting grooves 15 are respectively defined in rear ends of two opposite inner walls of the housing 10, and the second connecting plates 131 are respectively clamped in the second connecting groove 15, so that the front end of the observation cylinder 13 is inserted into and fixed to the rear end of the housing 10. Similarly, the second connecting plates 131 and the second connecting grooves 15 are further connected by bolts, so the observation cylinder 13 is stably fixed.

Furthermore, the main board 40 is electrically connected to a key board 41, and control keys 42 are disposed on the key board 41. The control keys 42 pass through a second side wall of the housing 10. The second side wall of the housing 10 is opposite to the first side wall of the housing 10, which is convenient for the user to operate.

Obviously, the embodiments described above are only some embodiments of the present disclosure, rather than all embodiments. The optional embodiments of the present disclosure are given in the accompanying drawings, but the optional embodiments do not limit the patent scope of the present disclosure. The present disclosure may be implemented in many different forms. On the contrary, the purpose of providing the embodiments is to make the understanding of the present disclosure more thorough and comprehensive. Although the present disclosure is described in detail with reference to the above embodiments, for those skilled in the art, it is still possible to modify the technical solutions recorded in the above specific implementation methods, or to replace some of the technical features therein with equivalents. Any equivalent structure made using the contents of the specification and the accompanying drawings of the present disclosure, directly or indirectly used in other related technical fields, is also within the protection scope of the present disclosure.

What is claimed is:

1. An infrared thermal imaging night vision monocular, comprising:
    a housing;
    an infrared lens module;
    a thermal imaging lens module;
    a main board; and
    a display screen;
    wherein the infrared lens module is disposed on a front end of the housing, the thermal imaging lens module is disposed on a first side wall of the housing, the display screen is disposed on a rear end of the housing, the main board is disposed in the housing, and the main board is electrically connected to the infrared lens module, the thermal imaging lens module, and the display screen;
    wherein the infrared lens module is configured to emit infrared light to capture an image of an external object, and the thermal imaging lens module is configured to receive infrared radiation of the external objects to form a thermal image;
    wherein the display screen is configured to sequentially display image information collected by the infrared lens module and image information collected by the thermal imaging lens module.

2. The infrared thermal imaging night vision monocular according to claim 1, wherein a protective shell is disposed on the first side wall of the housing, the thermal imaging lens module is mounted in the protective shell, and a lens of the thermal imaging lens module extends out of a front end of the protective shell.

3. The infrared thermal imaging night vision monocular according to claim 2, wherein a first opening is defined in an inner side wall of the protective shell, a second opening is defined in the first side wall of the housing, and the first opening is corresponding to and communicated with the second opening.

4. The infrared thermal imaging night vision monocular according to claim 1, wherein a lens carrier is disposed on the front end of the housing, and the infrared lens module is disposed in the lens carrier.

5. The infrared thermal imaging night vision monocular according to claim 4, wherein an infrared transceiver is disposed on one side of the lens carrier, and the infrared transceiver is electrically connected to the main board.

6. The infrared thermal imaging night vision monocular according to claim 4, wherein first connecting plates are respectively disposed on two opposite sides of a rear end of the lens carrier, first connecting grooves are respectively defined in front ends of two opposite inner walls of the housing, and the first connecting plates are respectively clamped in the first connecting grooves, so that the rear end of the lens carrier is inserted into and fixed to the front end of the housing.

7. The infrared thermal imaging night vision monocular according to claim 1, wherein an observation cylinder is disposed on the rear end of the housing, and the display screen is disposed on a front end of the observation cylinder.

8. The infrared thermal imaging night vision monocular according to claim 7, wherein an eyepiece is disposed at a rear end of the observation cylinder.

9. The infrared thermal imaging night vision monocular according to claim 7, wherein second connecting plates are respectively disposed on two opposite sides of the front end of the observation cylinder, second connecting grooves are respectively defined in rear ends of two opposite inner walls of the housing, and the second connecting plates are respectively clamped in the second connecting grooves, so that the front end of the observation cylinder is inserted into and fixed to the rear end of the housing.

10. The infrared thermal imaging night vision monocular according to claim 1, wherein the main board is electrically connected to a key board, control keys are disposed on the key board, the control keys pass through a second side wall of the housing, and the second side wall of the housing is opposite to the first side wall of the housing.

* * * * *